United States Patent
Mejia, Jr.

(10) Patent No.: US 12,022,976 B2
(45) Date of Patent: Jul. 2, 2024

(54) GYRATABLE GRILLING DEVICE

(71) Applicant: Javier Mejia, Jr., Edinburg, TX (US)

(72) Inventor: Javier Mejia, Jr., Edinburg, TX (US)

( * ) Notice: Subject to any disclaimer, the term of this patent is extended or adjusted under 35 U.S.C. 154(b) by 404 days.

(21) Appl. No.: 17/567,495

(22) Filed: Jan. 3, 2022

(65) Prior Publication Data
US 2022/0386808 A1 Dec. 8, 2022

Related U.S. Application Data

(60) Provisional application No. 63/208,221, filed on Jun. 8, 2021.

(51) Int. Cl.
*A47J 37/04* (2006.01)

(52) U.S. Cl.
CPC ........... *A47J 37/041* (2013.01); *A47J 37/043* (2013.01); *A47J 37/049* (2013.01)

(58) Field of Classification Search
CPC ...... A47J 37/041; A47J 37/043; A47J 37/049; A47J 33/00
USPC .......................................................... 99/387
See application file for complete search history.

(56) References Cited

U.S. PATENT DOCUMENTS

| | | | | |
|---|---|---|---|---|
| 2,486,345 A | * | 10/1949 | Triulzi | A47J 37/041 99/421 HV |
| 2,720,158 A | * | 10/1955 | Tomun | A47J 37/041 99/421 V |
| 4,245,373 A | * | 1/1981 | Coroneos | A23B 4/068 425/412 |
| 4,294,865 A | * | 10/1981 | Coroncos | A23L 13/426 426/514 |
| 4,393,090 A | * | 7/1983 | Coroneos | A22C 7/00 426/514 |
| 6,837,149 B1 | * | 1/2005 | Tsontakis | A47J 37/046 99/421 V |
| 2008/0216809 A1 | * | 9/2008 | Begotka | A47J 33/00 126/30 |
| 2009/0025573 A1 | * | 1/2009 | Thompson | A47J 37/041 99/421 H |

(Continued)

OTHER PUBLICATIONS

Rational Lamb and Pig Spit, Retrieved from Internet, Retrieved on Apr. 30, 2021 <URL: https://www.webstaurantstore.com/rational-60-70-819-26-5-lb-lamb-and-pig-spit/6456070819.html>.

(Continued)

*Primary Examiner* — Eric S Stapleton

(57) ABSTRACT

A gyratable grilling device allows attached food to be rotated about two different axes and the height between attached food and a heat source to be adjusted for desired cooking results. The gyratable grilling device includes an extension arm, a support lever, a support sleeve, a plurality of food-attaching assemblies, an anchoring fulcrum, and a locking mechanism. The extension arm, through connection to the support lever, allows attached food to be rotated about one axis. The support lever, through connection to the support sleeve and the anchoring fulcrum, allows attached food to be rotated about another axis. The plurality of food-attaching assemblies allows food to be attached to the extension arm. The anchoring fulcrum allows the gyratable grilling device to be mounted to a structure. The locking mechanism holds the support sleeve at a specific angle to achieve a desired height between the attached food and the heat source.

7 Claims, 6 Drawing Sheets

(56) References Cited

U.S. PATENT DOCUMENTS

2015/0201798 A1* 7/2015 Begotka .............. A47J 37/0772
  426/523
2020/0214496 A1* 7/2020 Moric ................. A47J 37/0704

OTHER PUBLICATIONS

Stainless Steel Electric BBQ Roaster Spit Pig Chicken Grill, Retrieved from Internet, Retrieved on Apr. 30, 2021 <URL: htttps://www.ebay.com/itm/384184669666>.

* cited by examiner

GYRATABLE GRILLING DEVICE

The current application claims a priority to the U.S. Provisional Patent application Ser. No. 63/208,221 filed on Jun. 8, 2021.

FIELD OF THE INVENTION

The present invention relates generally to grilling devices. More specifically, the present invention is a gyratable grilling device that allows attached food to be rotated about two different axes and the height between attached food and a heat source to be adjusted for desired cooking results.

BACKGROUND OF THE INVENTION

Cooking food over an open fire can be an enjoyable experience, but it is often difficult to find a suitable device to hold the food over the fire. Some campfire rings or pits have built-in cooking grates, but many do not, leaving users to devise their own makeshift grill out of clothes hangers, rocks, etc. Even if a built-in grate is provided, it is often unsuitable for a number of reasons. First, such grates are typically built into the fire pit or ring, so their orientation and height cannot be changed. The position of the grate may be too far or too close to the fire, depending on the intensity of the fire and the desired cooking temperature. Second, built-in grates are often limited in size since they can only cover part of the open ring. Especially for large pieces of meat, there may simply be too little space on the grate to cook larger cuts of meat or large game. Third, it can be difficult and dangerous to place or remove food on a built-in grate, because the fire may unexpectedly flare up and burn the cook's hand. Thus, there is a need for a rotatable grilling device, with sufficient space, and with means to easily remove the device from the flame for placing or removing food.

The present invention seeks to provide a gyratable grilling device. Although components of the present invention can be made using any type of metal, such components are preferably made of high strength steel tubing. The cross-section of the steel tubing is square, but other shapes can be utilized (e.g., circular, triangular, and other polygonal shapes). The present invention includes an extension arm, a support lever, a support sleeve, a plurality of food-attachment assemblies, and anchoring fulcrum in order to allow attached food to be rotated about two different axes for desired cooking results. The present invention can be attached to any table that is sufficiently durable to support the weight of the present invention and attached food. This is achieved by the anchoring fulcrum which is heat resistant to withstand typical grilling conditions. Further, the anchoring fulcrum allows the present invention to be attached to other structures such as a fire pit. The anchoring fulcrum preferably holds the present invention at a variety of angles to allow users to position the attached food to any desired height relative to the heat source.

DETAIL DESCRIPTIONS OF THE INVENTION

Figure 1:
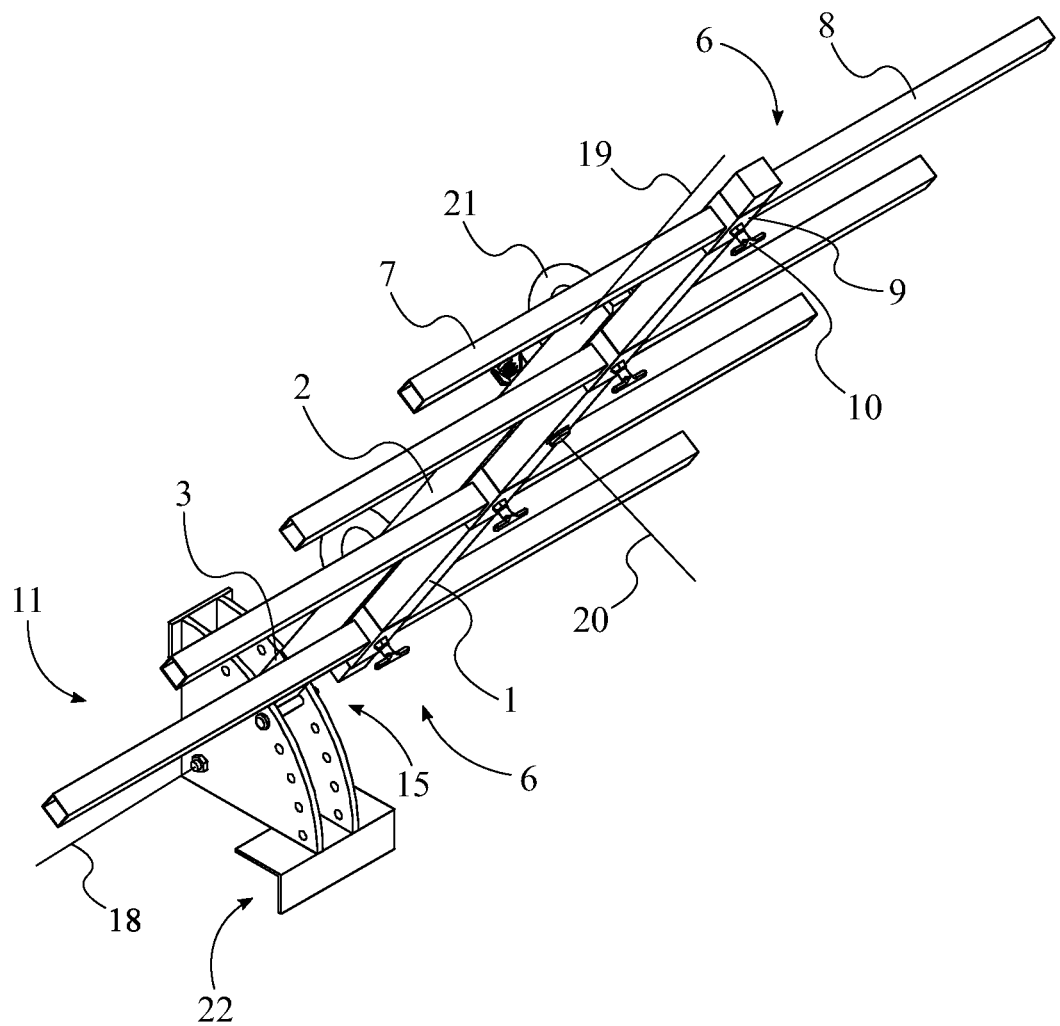
FIG. 1 is a right-side perspective view of the present invention.

All illustrations of the drawings are for the purpose of describing selected versions of the present invention and are not intended to limit the scope of the present invention.

In reference to FIGS. 1 through 6, the present invention is a gyratable grilling device that allows attached food to be rotated about two different axes and the height between the attached food and a heat source to be adjusted for desired cooking results. The present invention comprises an extension arm 1, a support lever 2, a support sleeve 3, a plurality of food-attaching assemblies 6, an anchoring fulcrum 11, and a locking mechanism 15. The extension arm 1, through connection to the support lever 2, allows attached food to be rotated about one axis. The support lever 2, through connection to the support sleeve 3 and the anchoring fulcrum 11, allows attached food to be rotated about another axis. The plurality of food-attaching assemblies 6 allows food to be attached to the extension arm 1. The anchoring fulcrum 11 allows the present invention to be mounted to or situated onto a structure such as, but not limited to, a table or fire pit. Additionally, the anchoring fulcrum 11 along with the locking mechanism 15 allows the present invention to be held at a variety of angles to allow users to position the attached food to any desired height relative to a heat source.

Figure 2:
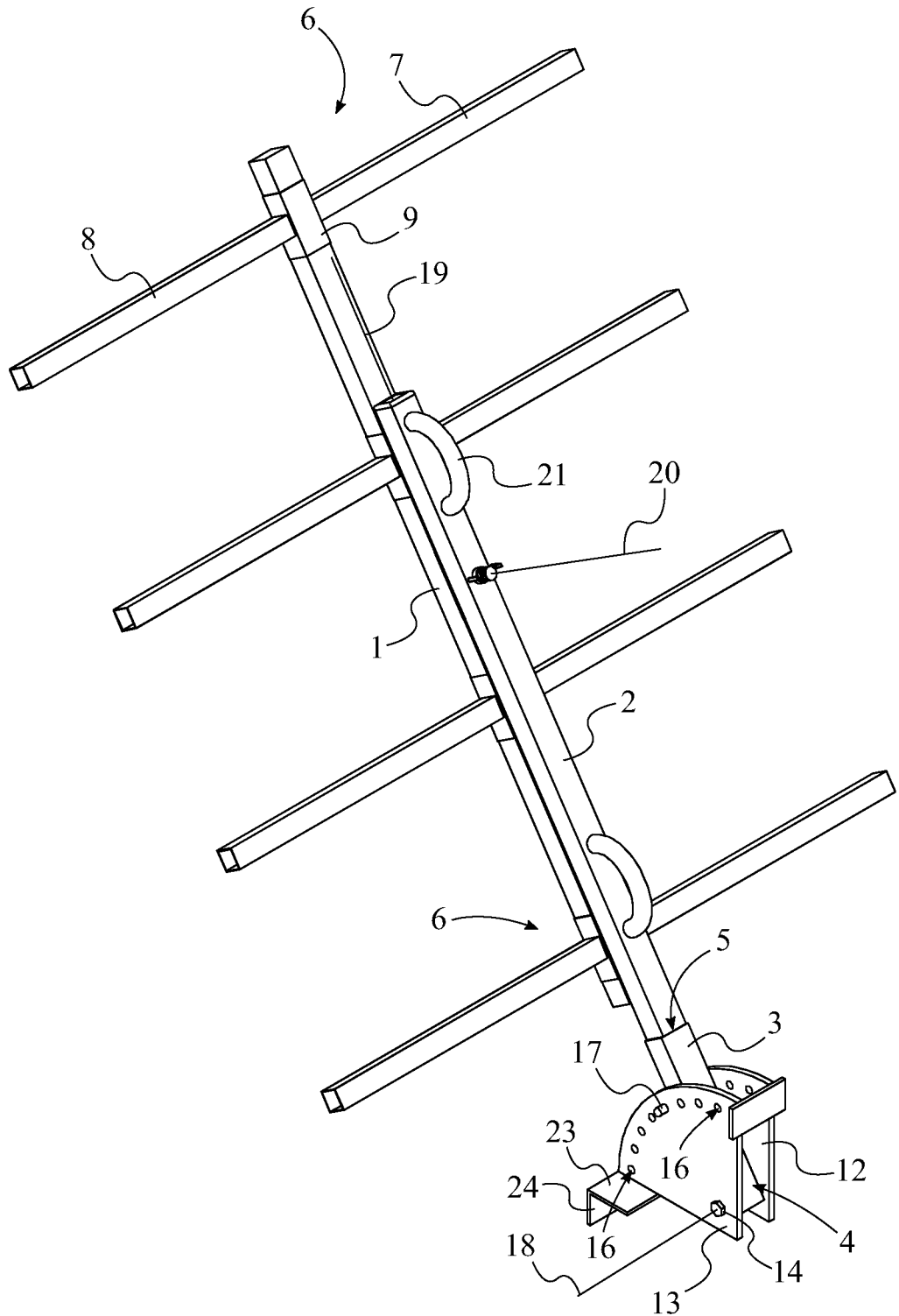
FIG. 2 is a left-side perspective view of the present invention.

The general configuration of the aforementioned components allows attached food to be rotated about two different axes and the height between attached food and a heat source to be adjusted for desired cooking results. With reference to FIGS. 1 and 2, the support sleeve 3 comprises a proximal sleeve end 4 and a distal sleeve end 5. The proximal sleeve end 4 is hingedly connected to the anchoring fulcrum 11 about a first rotation axis 18 by a fastener. In more detail, this arrangement allows the height between the attached food and a heat source to be adjusted by orienting the present invention at a variety of angles. The support lever 2 is rotatably connected into the distal sleeve end 5 about a second rotation axis 19. In more detail, an opening traverses into the support sleeve 3 from the distal sleeve end 5 and a cylindrical protrusion of the support lever 2 is inserted into the support sleeve 3 through the opening. Further, this arrangement allows attached food to be rotated in order to cook the front and rear of the attached food. The extension arm 1 is laterally positioned to the support lever 2, offset from the support sleeve 3. This arrangement positions the extension arm 1 in order to rotate with the support lever 2 about the second rotation axis 19. Further, the extension arm 1 is rotatably connected to the support lever 2 about a third rotation axis 20. In more detail, a fastener hole, that laterally traverses into the support lever 2, and a rotation fastener, that is laterally connected to the extension arm 1, are used to rotatably connect the extension arm 1 to the support lever 2. Moreover, this arrangement allows attached food to be rotated in order to cook the top and the bottom of the attached food. The extension arm 1 is preferably a linear structural bar with a rectangular cross section, and the support lever 2 and the support sleeve 3 are linear tubular structures with a rectangular cross section. The first rotation axis 18, the second rotation axis 19, and the third rotation axis 20 are positioned orthogonal to each other in order to achieve desired cooking results by cooking different parts of the attached food and adjusting how much heat is received by the attached food. Each of the plurality of food-attaching assemblies 6 is laterally mounted to the extension arm 1. In more detail, this arrangement allows each of the plurality of food-attaching assemblies 6 to be dismounted or to be moved along the extension arm 1 when desired. Further, the plurality of food-attaching assemblies 6 is distributed along the extension arm 1. In more detail, the plurality of food-attaching assemblies 6 is spaced along the extension arm 1 to provide multiple points to attach food. Lastly, the locking mechanism 15 is operatively coupled in between the support sleeve 3 and the anchoring fulcrum 11. The locking mechanism 15 is used to angle the support sleeve 3 at a specified orientation with the anchoring fulcrum 11. Thus, this arrangement allows the present invention to be held at a specific angle in order to maintain a desired height between the attached food and a heat source.

In order to lift and transport the present invention and with reference to FIG. 2, the present invention may further comprise at least one handle 21. The at least one handle 21 is laterally connected to the support lever 2, opposite the extension arm 1. This arrangement positions the at least one handle 21 to be easily accessible to the user and to prevent the user from accidentally touching any of the attached food. Further, the at least one handle 21 is preferably a pair of handles that are welded onto the support lever 2.

In order for each of plurality of food-attaching assemblies 6 to be mounted to the extension arm 1 and to provide multiple portions to attach food and with reference to FIGS. 1 and 2, each of the plurality of food-attaching assemblies 6 comprises a first peg 7, a second peg 8, a central sleeve 9, and a clamping mechanism 10. The first peg 7 and the second peg 8 provide portions in order to attached food. In more detail, the user can tie food onto the first peg 7 and the second peg 8. The first peg 7 and the second peg 8 are positioned perpendicular to the central sleeve 9. This arrangement allows the first peg 7 and the second peg 8 to allow even distribution of supporting weight. Further, the first peg 7 is laterally connected to the central sleeve 9 and the second peg 8 is laterally connected to the central sleeve 9, opposite the first peg 7. This arrangement positions the first peg 7 and the second peg 8 in order to provide multiple portions to attach food extending from each side of the extension arm 1. The first peg 7 and the second peg 8 are preferably welded onto the central sleeve 9. The first peg 7 and the second peg 8 are preferably linear tubular structures with a rectangular cross section. The central sleeve 9 is slidably mounted along the extension arm 1. In more detail, the central sleeve 9 is slid onto the extension in order to allow each of the plurality of food-attaching assemblies 6 to be moved along the extension arm 1. However, the central sleeve 9 prevents rotation about the extension arm 1 due to the central including the same cross-sectional shape of the extension arm 1. Lastly, the clamping mechanism 10 is operatively coupled in between the central sleeve 9 and the extension in order for the clamping mechanism 10 to be used to hold the central sleeve 9 in place along the extension arm 1. In more detail, the clamping mechanism 10 may be any type of mechanism that can secure the central sleeve 9 to the extension arm 1. The clamping mechanism 10 preferably comprises a fastener hole and a fastener in order to secure the central sleeve 9 to the extension arm 1.

In order for the support sleeve 3 to be hingedly mounted to the anchoring fulcrum 11 about the first rotation axis 18 and with reference to FIG. 2, the anchoring fulcrum 11 comprises a first fulcrum plate 12, a second fulcrum plate 13, and a pivot rod 14. The first fulcrum plate 12 and the second fulcrum plate 13 are positioned parallel to and offset from each other in order to form a clearance between the first fulcrum plate 12 and the second fulcrum plate 13. The pivot rod 14 is connected in between the first fulcrum plate 12 and the second fulcrum plate 13. In more detail, a fastener hole traverses through the first fulcrum plate 12 and the second fulcrum plate 13 and the pivot rod 14 is inserted into the fastener hole. The support sleeve 3 is positioned in between the first fulcrum plate 12 and the second fulcrum plate 13. In more detail, the support sleeve 3 is positioned within the clearance between the first fulcrum plate 12 and the second fulcrum plate 13. Lastly, the proximal sleeve end 4 is hingedly connected to the pivot rod 14. In more detail, a fastener hole laterally traverses through the proximal sleeve end 4 and the pivot rod 14 traverses through said fastener hole. Thus, the support sleeve 3 is hingedly mounted to the anchoring fulcrum 11 about the first rotation axis 18.

Figure 3:
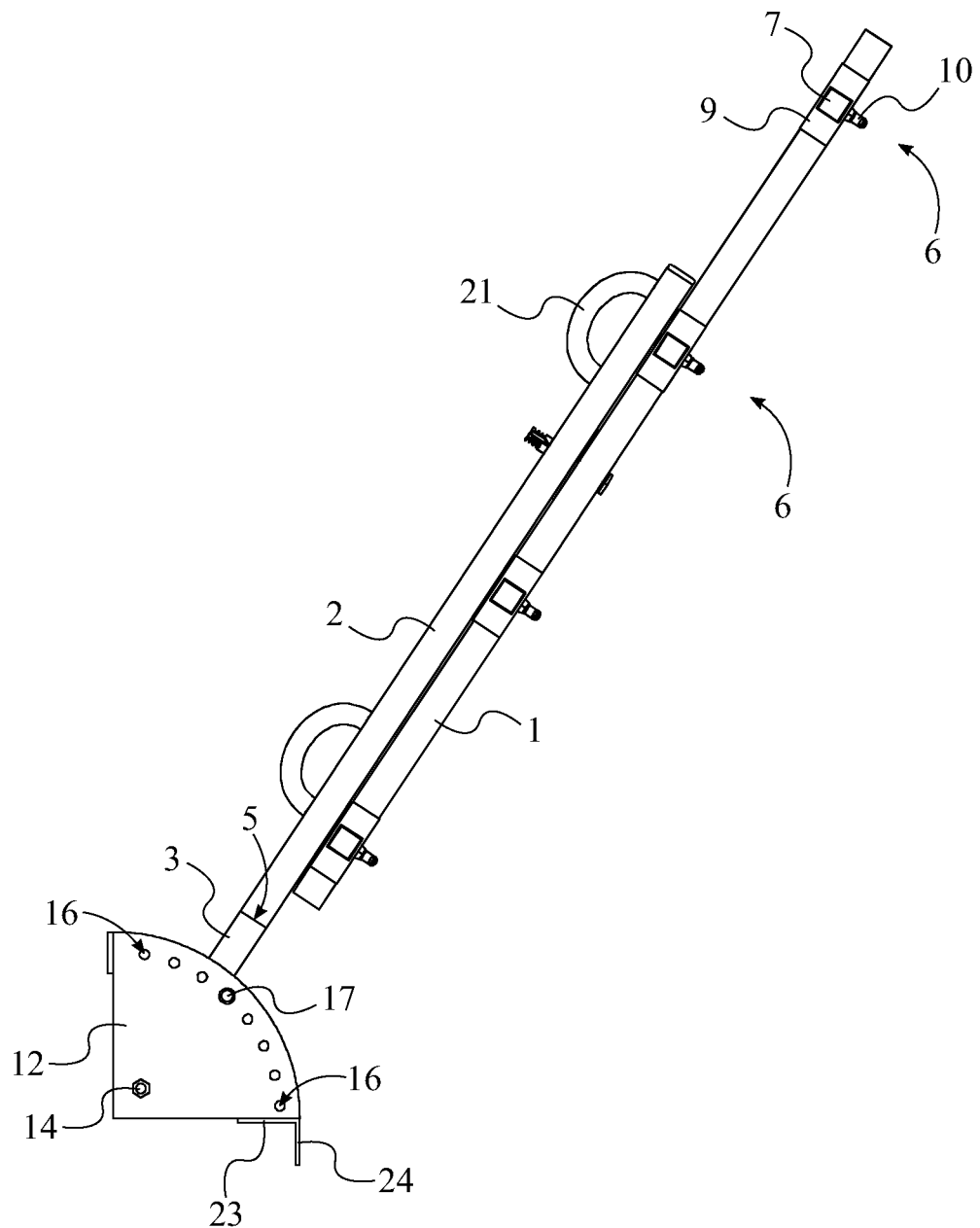
FIG. 3 is a right-side view of the present invention.
Figure 4:
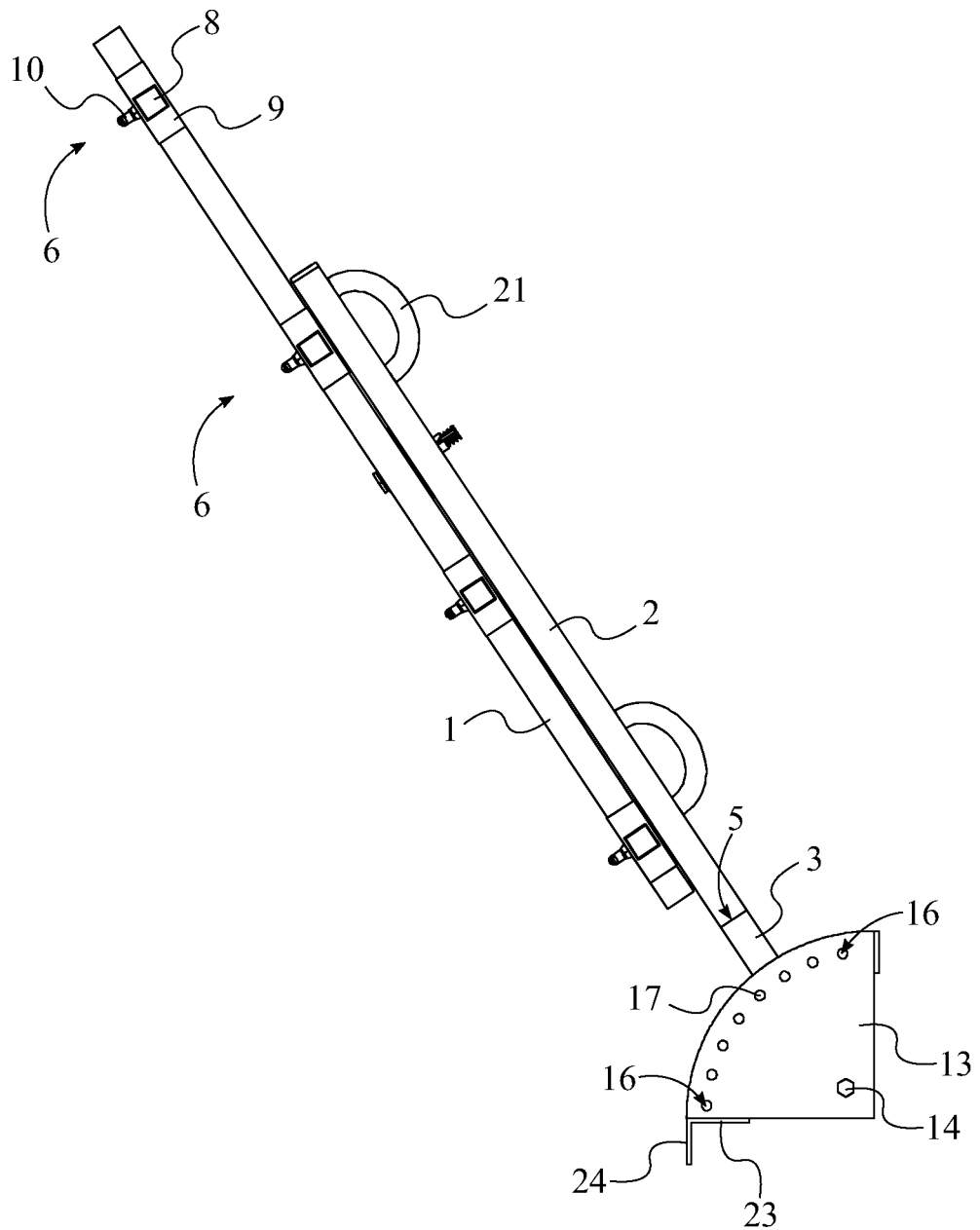
FIG. 4 is a left-side view of the present invention.

In order for the locking mechanism 15 to hold the support sleeve 3 at a specified angle with the anchoring fulcrum 11 and with reference to FIGS. 3 and 4, the locking mechanism 15 comprises a plurality of pin holes 16 and a locking pin 17. The plurality of pin holes 16 is radially positioned about the pivot rod 14. This arrangement creates multiple pin points at a variety of angles. Each of the plurality of pin holes 16 traverses through the first fulcrum plate 12 and the second fulcrum plate 13. In more detail, the plurality of pin holes 16 is a set of circular cutouts that traverse through the first fulcrum plate 12 and the second fulcrum plate 13. The locking pin 17 is engaged through a selected hole from the plurality of pin holes 16. In more detail, the user decides the angle of the support sleeve 3 with the anchoring fulcrum 11 by inserting the locking pin 17 into the selected hole. Lastly, the support sleeve 3 is pressed against the locking pin 17 and thus, the locking mechanism 15 holds the support sleeve 3 at a specified angle with anchoring fulcrum 11. In some embodiments, the present invention may further comprise a strap that is tethered to the locking pin 17 in order to prevent loss of the locking pin 17.

In one embodiment and in order for the present invention to be mounted to a structure such as a table and with reference to FIGS. 1, 3, and 4, the present invention may further comprise a bracing bracket 22. The bracing bracket 22 comprises a first bracket panel 23 and a second bracket panel 24. The first bracket panel 23 is peripherally connected along the second bracket panel 24 and the first bracket panel 23 is positioned perpendicular to the second bracket panel 24. In more detail, this arrangement forms a L-shaped bracket with the first bracket panel 23 and the second bracket panel 24. The first bracket panel 23 is connected perpendicular to the first fulcrum plate and the second fulcrum plate 13. In more detail, the first bracket panel 23 is preferably welded to the first fulcrum plate 12 and the second fulcrum plate 13. Further, the second bracket panel 24 is oriented away from the first fulcrum plate 12 and the second fulcrum plate 13. This arrangement allows the second bracket panel 24 to be mounted to a structure such as a table. More specifically, clamp tools may be used to mount the second bracket panel 24 to a structure such as a table. Moreover, the bracing bracket 22 is positioned offset from the pivot rod 14 in order to prevent any obstruction when adjusting the angle between the anchoring fulcrum 11 and the support sleeve 3.

Figure 5:
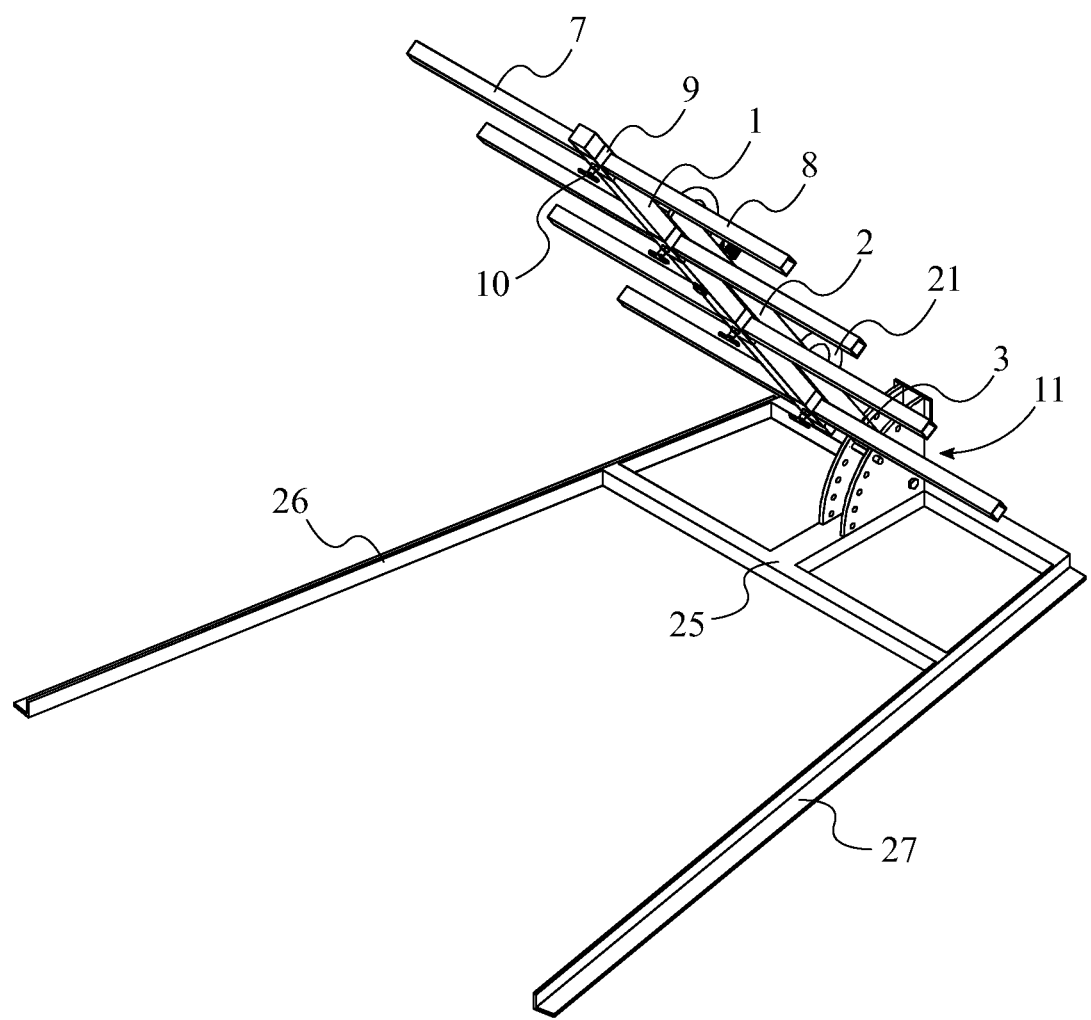
FIG. 5 is a front perspective view of the present invention with the base, the first extension leg, and the second extension leg.
Figure 6:
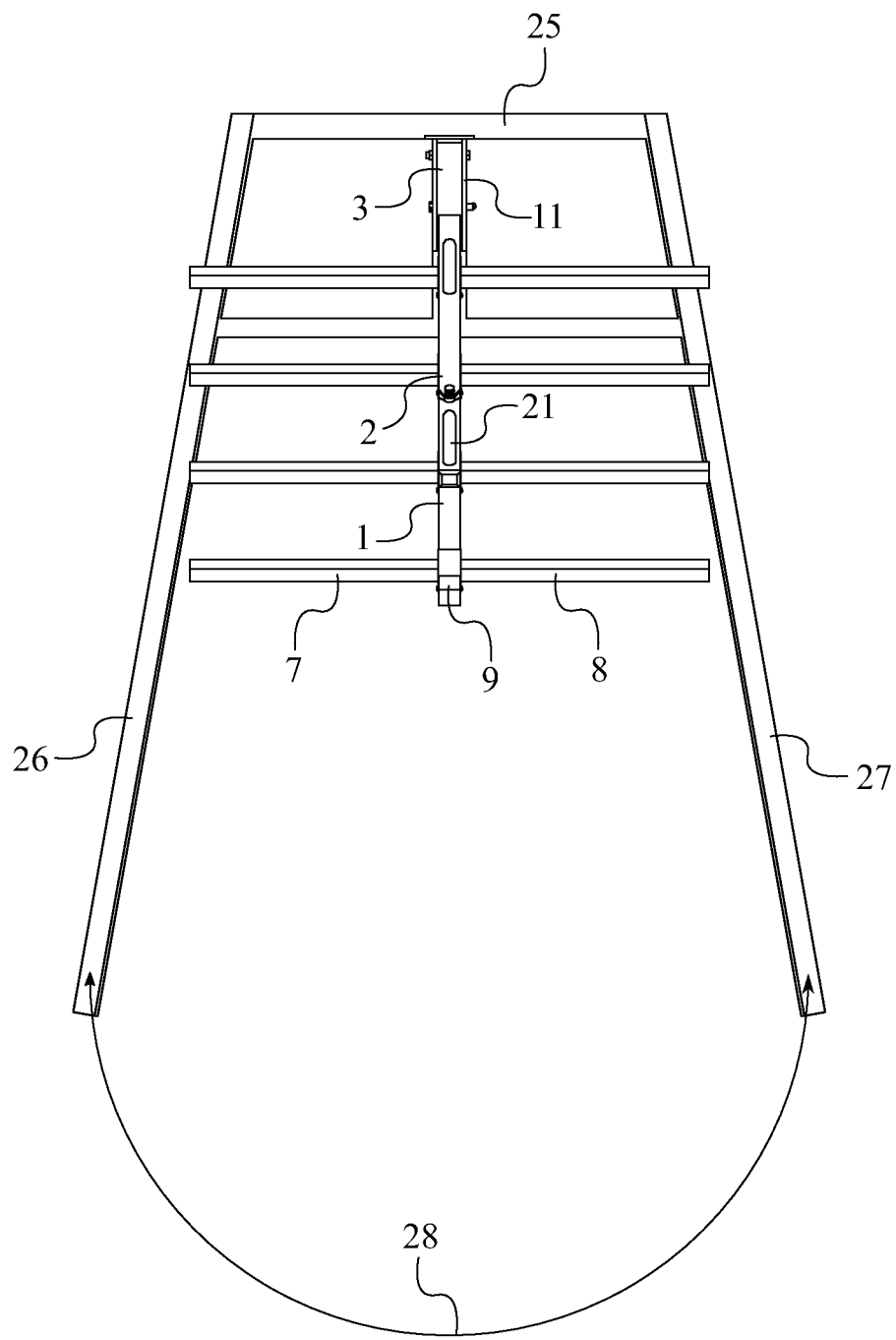
FIG. 6 is a top view of the present invention with the base, the first extension leg, and the second extension leg.

In a second embodiment and in order for the present invention to be mounted or situated onto a fire pit and with reference to FIGS. 5 and 6, the present invention may further comprise a flat base 25, a first extension leg 26, and a second extension leg 27. The anchoring fulcrum 11 is connected onto the flat base 25. In more detail, the anchoring fulcrum 11 is preferably welded onto the flat base 25. The first extension leg 26 and the second extension leg 27 is positioned coplanar to the flat base 25, and the first extension leg 26 and the second extension leg 27 is peripherally connected to the flat base 25. This arrangement prevents the present invention from tipping over due to the weight of the extension arm 1, the support sleeve 3, and the attached food. Further, the first extension leg 26 is oriented at an acute angle 28 with the second extension leg 27, and the support sleeve 3 and the support lever 2 are oriented in between the first extension leg 26 and the second extension leg 27. This arrangement creates an area for a heat source and allows the heat from the heat source to reach the support lever 2, and thus, the food attached to the extension arm 1.

The anchoring fulcrum 11 may further comprise a backing plate in order to prevent the support sleeve from over rotating in the direction opposite the heat source. The backing plate is connected perpendicular to the first fulcrum plate 12 and the second fulcrum plate 13. In more detail, the backing plate is preferably welded onto the first fulcrum plate 12 and the second fulcrum plate 13. The backing plate is positioned offset from the bracing bracket 22. In more detail, the backing plate is positioned at the top of the anchoring fulcrum 11 where the backing plate designates 90 degrees from the ground surface.

Although the invention has been explained in relation to its preferred embodiment, it is to be understood that many other possible modifications and variations can be made without departing from the spirit and scope of the invention as hereinafter claimed.

What is claimed is:

1. A gyratable grilling device comprising:
an extension arm;
a support lever;
a support sleeve;
a plurality of food-attaching assemblies;
an anchoring fulcrum;
a locking mechanism;
the support sleeve comprising a proximal sleeve end and a distal sleeve end;
the proximal sleeve end being hingedly connected to the anchoring fulcrum about a first rotation axis;
the support lever being rotatably connected into the distal sleeve end about a second rotation axis;
the extension arm being laterally positioned to the support lever, offset from the support sleeve;
the extension arm being rotatably connected to the support lever about a third rotation axis;
the first rotation axis, the second rotation axis, and the third rotation axis being positioned orthogonal to each other;
each of the plurality of food-attaching assemblies being laterally mounted to the extension arm;
the plurality of food-attaching assemblies being distributed along the extension arm;
the locking mechanism being operatively coupled in between the support sleeve and the anchoring fulcrum, wherein the locking mechanism is used to angle the support sleeve at a specified orientation with the anchoring fulcrum.

2. The gyratable grilling device as claimed in claim 1 comprising:
at least one handle;
the at least one handle being laterally connected to the support lever, opposite the extension arm.

3. The gyratable grilling device as claimed in claim 1 comprising:
each of the plurality of food-attaching assemblies comprising a first peg, a second peg, a central sleeve, and a clamping mechanism;
the first peg and the second peg being positioned perpendicular to the central sleeve;
the first peg being laterally connected to the central sleeve;
the second peg being laterally connected to the central sleeve, opposite the first peg;
the central sleeve being slidably mounted along the extension arm;
the clamping mechanism being operatively coupled in between the central sleeve and the extension arm, wherein the clamping mechanism is used to hold the central sleeve in place along the extension arm.

4. The gyratable grilling device as claimed in claim 1 comprising:
the anchoring fulcrum comprising a first fulcrum plate, a second fulcrum plate, and a pivot rod;
the first fulcrum plate and the second fulcrum plate being positioned parallel to and offset from each other;
the pivot rod being connected in between the first fulcrum plate and the second fulcrum plate;
the support sleeve being positioned in between the first fulcrum plate and the second fulcrum plate;
the proximal sleeve end being hingedly connected to the pivot rod.

5. The gyratable grilling device as claimed in claim 4 comprising:
the locking mechanism comprising a plurality of pin holes and a locking pin;
the plurality of pin holes being radially positioned about the pivot rod;
each of the plurality of pin holes traversing through the first fulcrum plate and the second fulcrum plate;
the locking pin being engaged through a selected hole from the plurality of pin holes;
the support sleeve being pressed against the locking pin.

6. The gyratable grilling device as claimed in claim 4 comprising:
a bracing bracket;
the bracing bracket comprising a first bracket panel and a second bracket panel;
the first bracket panel being peripherally connected along the second bracket panel;
the first bracket panel being positioned perpendicular to the second bracket panel;
the first bracket panel being connected perpendicular to the first fulcrum plate and the second fulcrum plate;
the second bracket panel being oriented away from the first fulcrum plate and the second fulcrum plate;
the bracing bracket positioned offset from the pivot rod.

7. The gyratable grilling device as claimed in claim 1 comprising:
a flat base;
a first extension leg;
a second extension leg;
the anchoring fulcrum being connected onto the flat base;
the first extension leg and the second extension leg being positioned coplanar to the flat base;
the first extension leg being oriented at an acute angle with the second extension leg;
the first extension leg and the second extension leg being peripherally connected to the flat base;

the support sleeve and the support lever being oriented in between the first extension leg and the second extension leg.

* * * * *